US009903397B2

United States Patent
Takayanagi et al.

(10) Patent No.: US 9,903,397 B2
(45) Date of Patent: Feb. 27, 2018

(54) OIL PUMP (71) Applicant: MAKITA CORPORATION, Aichi (JP)

(72) Inventors: Yoshiaki Takayanagi, Tokyo (JP);
Hiroki Nagase, Tokyo (JP)

(73) Assignee: MAKITA CORPORATION, Aichi (JP)

( * ) Notice: Subject to any disclaimer, the term of this patent is extended or adjusted under 35 U.S.C. 154(b) by 260 days.

(21) Appl. No.: 14/818,685

(22) Filed: Aug. 5, 2015

(65) Prior Publication Data

US 2016/0047401 A1 Feb. 18, 2016

(30) Foreign Application Priority Data

Aug. 12, 2014 (JP) ................ 2014-164438

(51) Int. Cl.
| F15B 15/14 | (2006.01) |
|---|---|
| F04B 53/16 | (2006.01) |
| F04B 53/18 | (2006.01) |
| F04B 53/22 | (2006.01) |
| F16N 13/04 | (2006.01) |
| B27B 17/12 | (2006.01) |

(52) U.S. Cl.
CPC .............. *F15B 15/14* (2013.01); *F04B 53/16* (2013.01); *F04B 53/18* (2013.01); *F04B 53/22* (2013.01); *F16N 13/04* (2013.01); *B27B 17/12* (2013.01)

(58) Field of Classification Search
CPC .......... F04B 9/042; F04B 53/22; F16N 13/04; F16N 13/10; F16N 13/14
See application file for complete search history.

(56) References Cited

U.S. PATENT DOCUMENTS 3,068,961 A * 12/1962 Stihl ............... B27B 17/12
123/DIG. 5
3,938,622 A * 2/1976 Densow ............ B27B 17/12
184/15.1
(Continued)

FOREIGN PATENT DOCUMENTS

GB 270116 A * 5/1927 ............ F16N 13/04
JP 64-024180 1/1989

OTHER PUBLICATIONS

Japanese Office Action for JP 2014-164438 dated Nov. 21, 2017, along with English-language translation thereof.
(Continued)

*Primary Examiner* — Michael Leslie
*Assistant Examiner* — Matthew Wiblin
(74) *Attorney, Agent, or Firm* — Greenblum & Bernstein, P.L.C.

(57) ABSTRACT

The present invention relates to an oil pump for use in and attached to a device (e.g., chain saw) having an oil-supplied portion requiring an oil supply. An oil pump supplies lubricating oil to a guide groove of a guide bar in such a manner that a plunger having a gear portion meshing with a drive worm provided on a chain saw reciprocally moves in a pump body while rotating. Two guide pins for positioning an oil pump when attaching the oil pump to a chain saw body are provided on an attachment surface of the pump body to the chain saw body. The two guide pins are spaced apart in an axial direction of the plunger, each disposed on a centerline of a transverse cross section of the plunger.

12 Claims, 6 Drawing Sheets

(56) References Cited

U.S. PATENT DOCUMENTS

| | | | | | |
|---|---|---|---|---|---|
| 4,000,790 | A | * | 1/1977 | Seufer | F01M 1/02 |
| | | | | | 184/27.1 |
| 4,034,830 | A | * | 7/1977 | Mukai | F16N 13/02 |
| | | | | | 184/27.1 |
| 4,036,326 | A | * | 7/1977 | Mukai | F16N 13/04 |
| | | | | | 184/27.1 |
| 4,678,411 | A | * | 7/1987 | Wieland | F16N 13/14 |
| | | | | | 417/500 |
| 4,797,073 | A | * | 1/1989 | Kubota | F04B 7/06 |
| | | | | | 184/33 |
| 5,236,314 | A | * | 8/1993 | Nagashima | B27B 17/12 |
| | | | | | 184/33 |
| 7,033,149 | B2 | * | 4/2006 | Lugger | F04B 7/06 |
| | | | | | 417/218 |

OTHER PUBLICATIONS

Chinese Office Action for CN 201510494005.9 dated Oct. 10, 2017, along with English-language translation thereof.

\* cited by examiner

A-A CROSS-SECTION VIEW

ENLARGED VIEW OF PORTION B

FIG. 5

C-C CROSS-SECTION VIEW

FIG. 6

D-D CROSS-SECTION VIEW

FIG. 7

OIL PUMP

CROSS REFERENCE TO RELATED APPLICATION

The application claims priority to Japanese Patent Application No. 2014-164438, filed on Aug. 12, 2014, the entire contents of which are incorporated herein by reference.

BACKGROUND OF THE INVENTION

1. Field of the Invention

The present invention relates to an oil pump for use in and attached to a device (for example, chain saw) having an oil-supplied section requiring an oil supply.

2. Description of Related Art

In a chain saw, a saw chain driven by a motor (engine, electric motor, etc.) rotates (runs) at a high speed around a guide bar in contact with the guide bar. Therefore, in the chain saw, there is provided an oil pump that supplies lubricating oil for reducing friction and abrasion between sliding portions of the saw chain and the guide bar. For example, an oil pump disclosed in Japanese Patent Laid-Open Publication No. S64-24180 is configured to supply lubricating oil to a guide rail in such a manner that a pump piston having a gear meshing with a transmission worm driven by a motor moves in an axial direction while rotating in a piston cylinder of a pump case.

An oil pump having such a configuration is often composed to be separated from the transmission worm. That is to say, the transmission worm can be attached to a rotating shaft rotated by the motor, and the oil pump can be attached to the chain saw separately from the transmission worm. Hence, it is necessary that the oil pump is attached to the chain saw so that a center distance between the rotating shaft (transmission worm) and the pump piston (gear) can become an appropriate distance.

Regarding this point, a pump case of an oil pump disclosed in Japanese Patent Laid-Open Publication No. S64-24180 includes, above a pump piston, a cylindrical portion, which is capable of accommodating a transmission worm. Therefore, it may be conceived that, for example, if the cylindrical portion is used for positioning the oil pump to the chain saw, the oil pump can be attached to an appropriate position of the chain saw.

However, the cylindrical portion enlarges the oil pump more than necessary, and moreover, increases weight thereof. In recent years, reduction in size and weight has been required also for the chain saw, and it is also necessary to reduce size and weight of the oil pump for use in and attached to the chain saw. Meanwhile, for example, if the cylindrical portion is removed for the purpose of reducing in size and weight, then it becomes difficult to attach the oil pump to the appropriate position of the chain saw.

Note that such a problem is not limited to the oil pump for use in the chain saw, and can be said to be common to oil pumps for use in a variety of devices, each of which includes the oil-supplied portion requiring an oil supply.

Therefore, it is an object of the present invention to provide an oil pump for use in and attached to a device having an oil-supplied portion requiring an oil supply, the oil pump being capable of ensuring attachment accuracy to the device and achieving the reduction in size and weight.

SUMMARY OF THE INVENTION

In accordance with an aspect of the present invention, there is provided an oil pump configured to be attached to a predetermined position of a device having an oil-supplied portion requiring an oil supply. This oil pump is configured to supply oil to the oil-supplied portion in such a manner that a plunger having a gear portion meshing with a drive worm provided on the device reciprocally moves in a pump body while rotating. The oil pump includes: an attachment surface provided on the pump body and attached to the predetermined position; and two positioning portions provided on the attachment surface, the positioning portions positioning the oil pump in an event of attaching the oil pump to the predetermined position. These two positioning portions are spaced apart in an axial direction of the plunger, and each thereof is disposed on a centerline of a transverse cross section of the plunger.

Other objects and features of aspects of the present invention will be understood from the following description with reference to the accompanying drawings.

DESCRIPTION OF PREFERRED EMBODIMENTS

Figure 1:
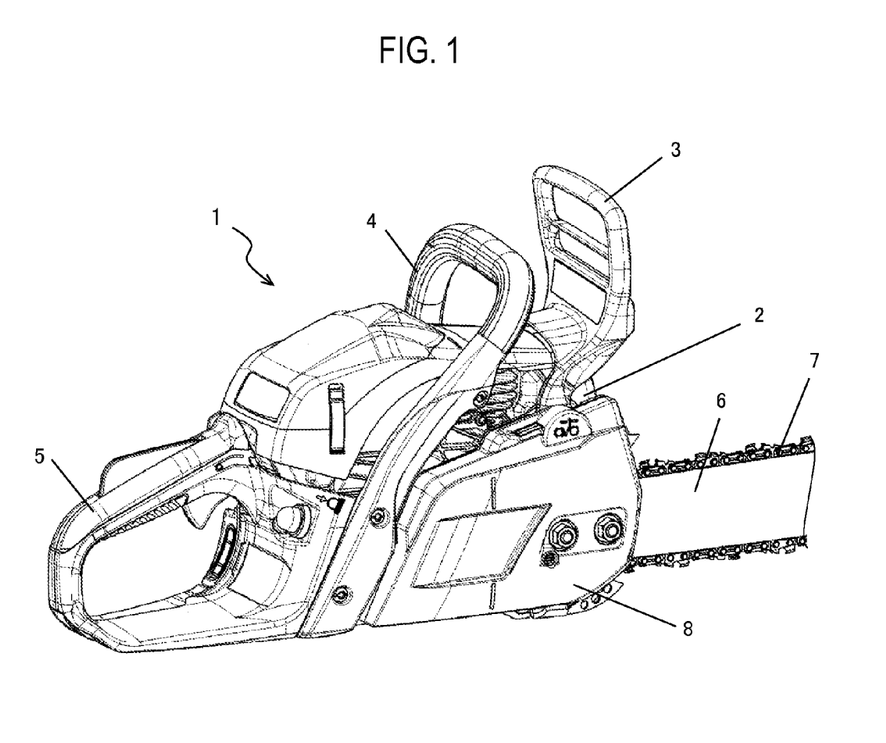
FIG. 1 is a view illustrating an exterior appearance of a chain saw in which an oil pump according to an embodiment of the present invention is used.
Figure 2:
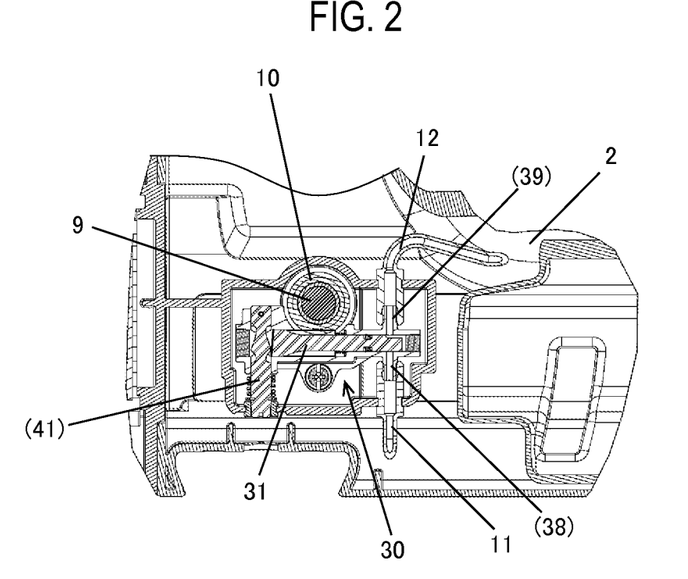
FIG. 2 is an enlarged cross-sectional view of main portions of the chain saw.

A description is made below of embodiments of the present invention with reference to the accompanying drawings. FIG. 1 and FIG. 2 illustrate a configuration of a chain saw in which an oil pump according to an embodiment of the present invention is used. FIG. 1 is a view illustrating an exterior appearance of the chain saw, and FIG. 2 is an enlarged cross-sectional view (cross-sectional view along a back-and-forth direction) of main portions of the chain saw.

As illustrated in FIG. 1, a chain saw 1 has a chain saw body 2 including a motor (not shown) such as an engine and an electric motor and a sprocket (not shown) rotated by the motor. In the chain saw body 2, there are provided a front guard 3, a front handle 4, a rear handle 5, etc. Moreover, a guide bar 6 is attached to the chain saw body 2. The guide bar 6 extends forward from the chain saw body 2, and a saw chain 7 is wrapped around the guide bar 6 and the sprocket. A rear side of the guide bar 6 (and the sprocket) is (are) covered with a chain cover 8. A guide groove is formed on a peripheral edge portion of the guide bar 6, and the saw chain 7 runs along the guide groove of the guide bar 6 following the rotation of the sprocket. In such a way, the chain saw 1 can cut an object such as wood.

Moreover, as illustrated in FIG. 2, an oil pump 30 is provided in the chain saw 1. In this embodiment, the oil pump 30 is composed as a plunger pump, and is attached to a predetermined position of the chain saw 1 (specifically, a predetermined position of the chain saw body 2). The oil pump 30 supplies lubricating oil (chain oil) to the guide groove of the guide bar 6 in such a manner that a plunger 31 of the oil pump 30 is driven by a drive member attached to a rotating shaft (crankshaft, motor output shaft, etc.) 9 rotated by the motor. In this embodiment, the drive member is a drive worm 10. That is to say, in this embodiment, the oil pump 30 is configured to be driven by the motor through the drive worm 10 composed to be separated from the oil pump 30 and provided (attached) to the chain saw 1 (chain saw body 2). Since the lubricating oil is supplied to the guide groove of the guide bar 6 by the oil pump 30, friction and abrasion between sliding portions of the guide groove of the guide bar 6 and the saw chain 7 can be reduced.

Figure 3A:
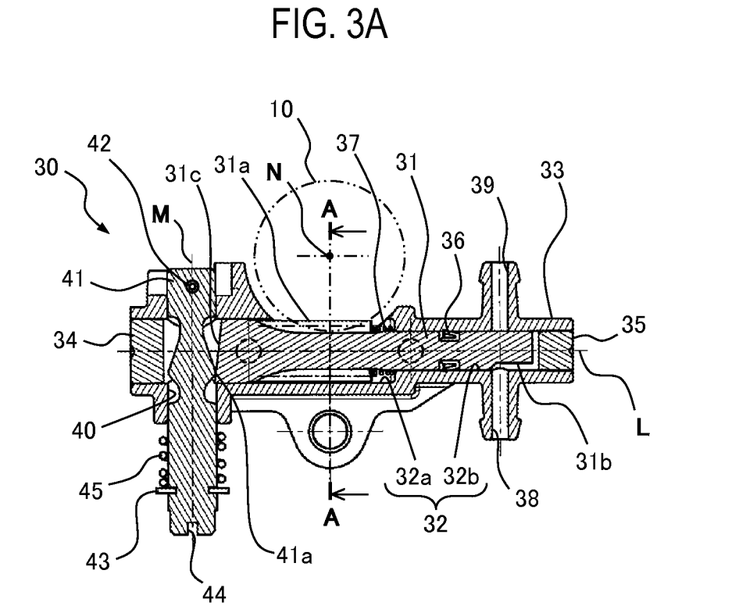
FIG. 3A is a cross-sectional view of the oil pump.
Figure 3B:
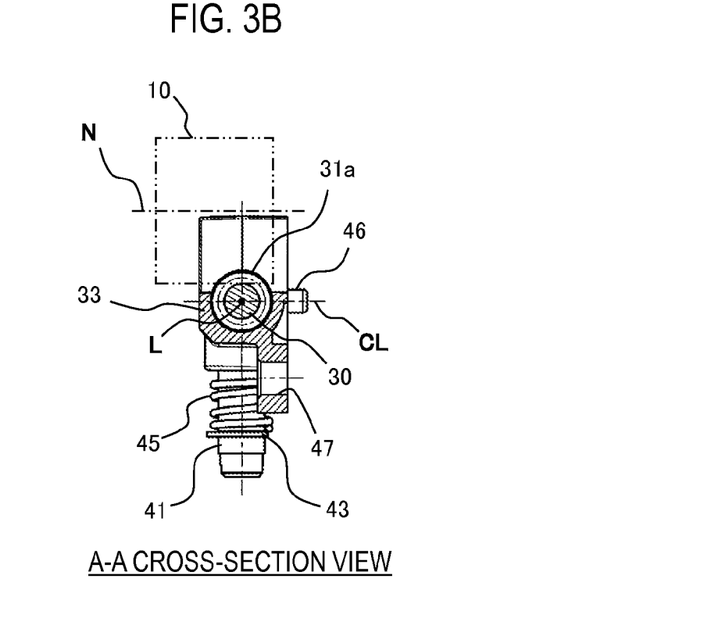
FIG. 3B is an A-A cross-sectional view of FIG. 3A.
Figure 3C:
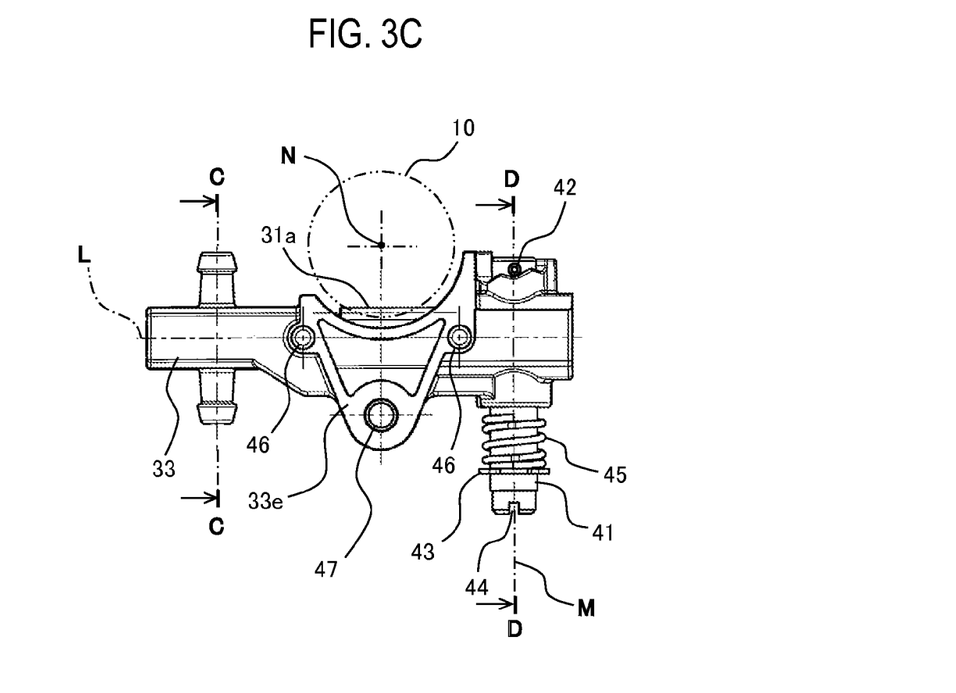
FIG. 3C is a rear view of the oil pump.
Figure 3D:
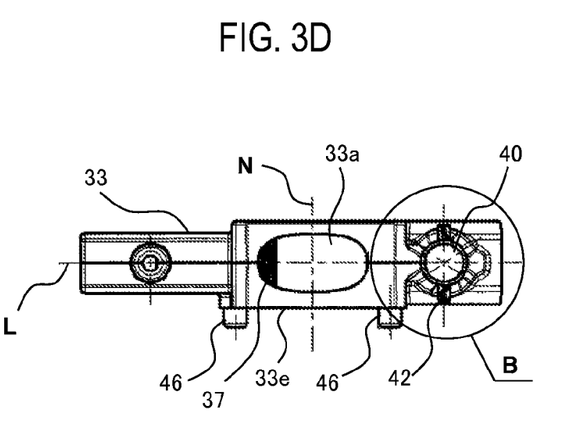
FIG. 3D is a plan view of the oil pump.
Figure 4:
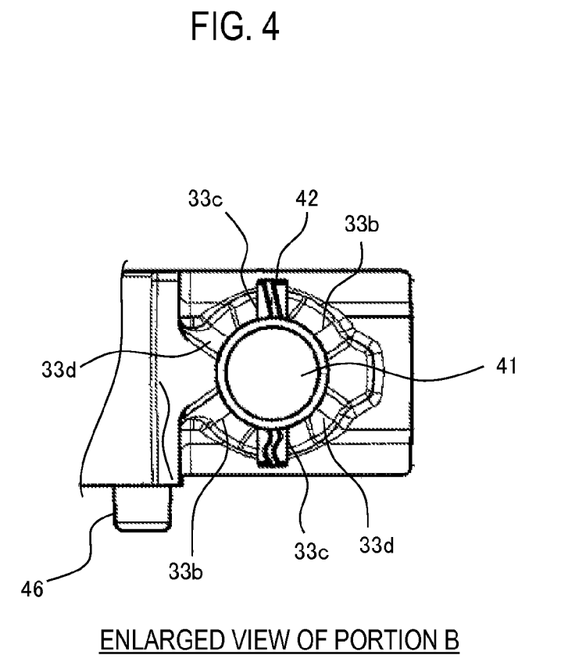
FIG. 4 is an enlarged view of a portion B of FIG. 3D.
Figure 5:
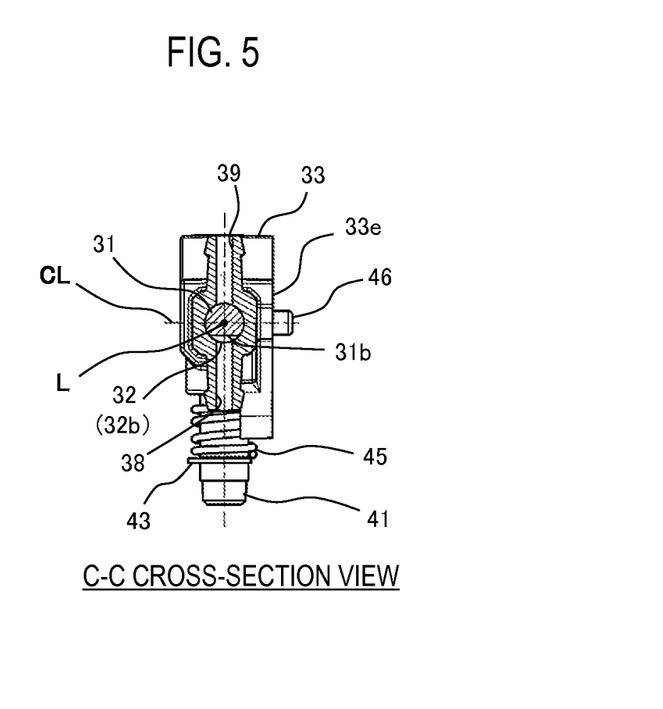
FIG. 5 is a C-C cross-sectional view of FIG. 3C.
Figure 6:
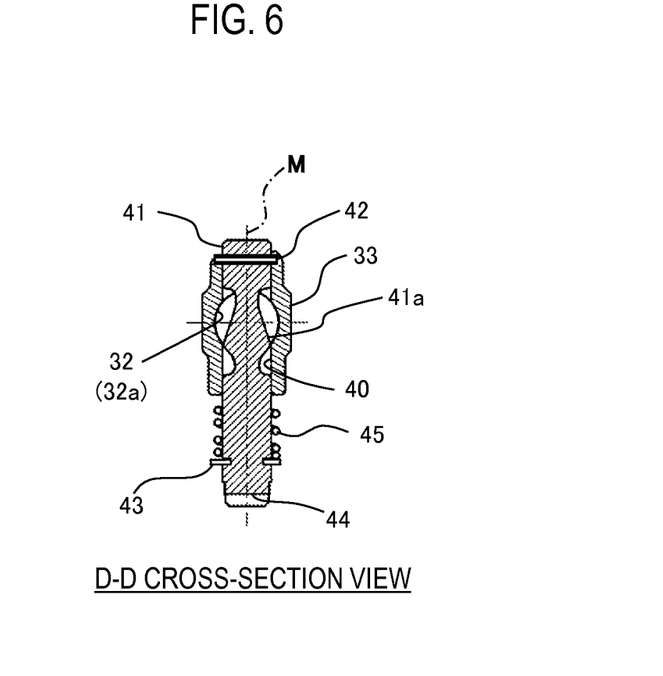
FIG. 6 is a D-D cross-sectional view of FIG. 3C.
Figure 7:
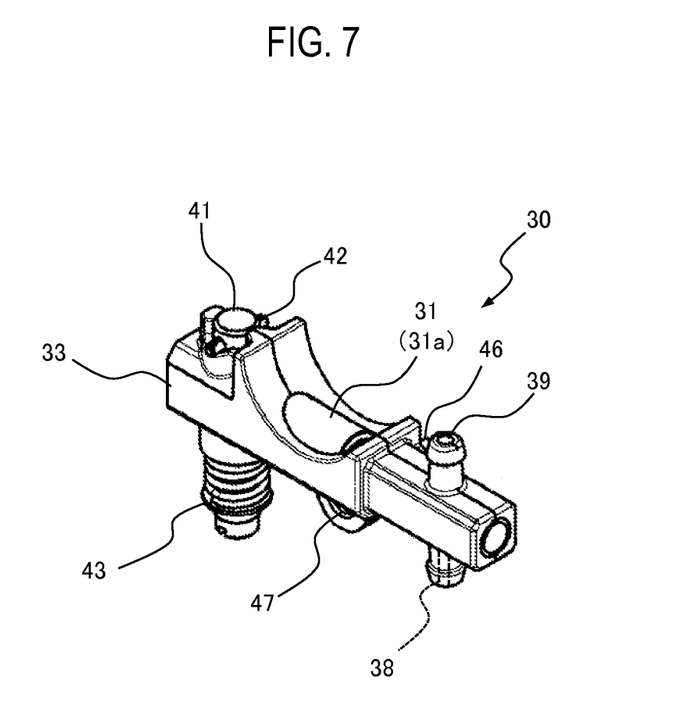
FIG. 7 is a perspective view of the oil pump.

FIGS. 3A to 3D and FIG. 4 to FIG. 7 illustrate a configuration of the oil pump 30. FIG. 3A is a cross-sectional view (cross-sectional view viewed from front) of the oil pump 30, FIG. 3B is an A-A cross-sectional view of FIG. 3A, FIG. 3C is a rear view of the oil pump 30, and FIG. 3D is a plan view of the oil pump 30. Moreover, FIG. 4 is an enlarged view of a portion B of FIG. 3D, FIG. 5 is a C-C cross-sectional view of FIG. 3C, FIG. 6 is a D-D cross-sectional view of FIG. 3C, and FIG. 7 is a perspective view of the oil pump 30.

The oil pump 30 has a pump body 33 in which a cylinder 32 housing the plunger 31 therein is formed. The cylinder 32 is formed as a stepped cylinder having a larger-diameter portion 32a and a smaller-diameter portion 32b. The cylinder 32 is formed so as to penetrate the pump body 33 in a longitudinal direction of the pump body 33 (right-and-left direction of FIG. 3, corresponding to the back-and-forth direction of the chain saw 1), and both end portions of the cylinder 32 are individually closed by closing plugs 34 and 35 (refer to FIG. 3A).

The plunger 31 has a gear portion 31a on an intermediate portion thereof. A part of the plunger 31 between the gear portion 31a and a rear end (left in FIG. 3A) are housed in the larger-diameter portion 32a of the cylinder 32, and a tip end side (right side in FIG. 3A) of the gear portion 31a of the plunger 31 is housed in the smaller-diameter portion 32b of the cylinder 32. The gear portion 31a of the plunger 31 is configured so that a part of the gear portion 31a can be exposed from an opening 33a formed on (an upper portion of) the pump body 33 (refer to FIG. 3D), and that such an exposed part thereof can mesh with the drive worm 10 provided on the chain saw body 2. Moreover, the plunger 31 is supported on both sides across the gear portion 31a so as to be slidable and rotatable in the cylinder 32. That is to say, the plunger 31 is supported by (an inner circumferential surface of the cylinder 32 of) the pump body 33 at two points spaced apart in a direction of an axis L of the plunger 31.

As illustrated in FIG. 3A, onto a predetermined position on the tip end side (right in the figure) of the gear portion 31a of the plunger 31, an oil seal 36 is attached, which seals a space between an outer circumferential surface of the plunger 31 and an inner circumferential surface of (the smaller-diameter portion 32b of) the cylinder 32. Moreover, a D-cut portion 31b is formed on a tip end portion (right end portion in the figure) of the plunger 31, and a rear end surface (left end surface in the FIG. 31c of the plunger 31 is formed into an inclined surface. Then, the plunger 31 is always urged to the rear (left in the figure) by a spring 37 arranged between such a plunger tip end-side side surface of the gear portion 31a and the pump body 33, specifically a stepped surface of the cylinder 32 that is a transition portion from the larger-diameter portion 32a to the smaller-diameter portion 32b.

On one end side (tip end side of the plunger 31) in the longitudinal direction of the pump body 33, there are formed an inlet port 38 and a discharge port 39, which communicate with an inside of (the smaller-diameter portion 32b of) the cylinder 32. The inlet port 38 and the discharge port 39 are formed so as to protrude from an outer circumferential surface of the pump body 33, and the inlet port 38 and the discharge port 39 are arranged on opposite sides across the axis (=central axis of the cylinder 32) L of the plunger 31. In this embodiment, the inlet port 38 is formed on a lower portion of the pump body 33, and the discharge port 39 is formed on an upper portion of the pump body 33. When the plunger 31 rotates and the D-cut portion 31b formed on the tip end portion of the plunger 31 comes to a position corresponding to the inlet port 38, the inlet port 38 open to the inside of the cylinder 32, and when the plunger 31 rotates and the D-cut portion 31b comes to a position corresponding to the discharge port 39, the discharge port 39 open to the inside of the cylinder 32 (refer to FIG. 3A and FIG. 5).

The inlet port 38 is connected to an oil tank (not shown) through an oil suction pipe 11 (refer to FIG. 2). On the other hand, the discharge port 39 is connected to the guide groove of the guide bar 6 or a vicinity thereof through an oil supply pipe 12 (refer to FIG. 2).

Moreover, on other end side (rear end side of the plunger 31) of the pump body 33, there is formed a through hole 40 that penetrates the pump body 33 in a direction perpendicular to the axis (=central axis of the cylinder 32) L of the plunger 31. In this embodiment, the through hole 40 penetrates the pump body 33 in an up-and-down direction, in other words, substantially in parallel to the inlet port 38 and the discharge port 39, which protrude from the outer circumferential surface of the pump body 33, and through the through hole 40, there is inserted a control shaft 41 capable of controlling an amount of reciprocating movement (stroke amount) of the plunger 31 in the cylinder 32 (refer to FIG. 3A, FIG. 3C and FIG. 6).

An intermediate portion of the control shaft 41 in a direction of an axis M is located in the through hole 40, and both ends of the control shaft 41 protrude (are exposed to an outside) from the through hole 40. A part of the intermediate portion is also located in an inside of (the larger-diameter portion 32a of) the cylinder 32. The control shaft 41 is supported on both sides (upper side and lower side) across the part of the intermediate portion located in the cylinder 32, so as to be slidable and rotatable in the through hole 40. That is to say, a part of the control shaft 41 is located in the pump body 33 (through hole 40), and the control shaft 41 is supported on the pump body 33 (inner circumferential surface of the through hole 40) at two points spaced apart in the direction of the axis M of the control shaft 41 (i.e., the control shaft 41 is supported at both of upper and lower sides).

The control shaft 41 includes a movement adjustment portion 41a, which adjusts an amount of reciprocating movement (stroke amount) of the plunger 31 by bringing the rear end surface (inclined surface) 31c of the plunger 31 into contact with the part of the intermediate portion located in the cylinder 32. In this embodiment, the part of the intermediate portion located in the cylinder 32, is formed so as to have an outer diameter continuously varied in the direction of the axis M of the control shaft 41, and to have a portion having a maximum outer diameter functioning as the movement adjustment portion 41a.

At a portion on one end side (upper end side) of the control shaft 41, which protrudes to one side (upper side) of the through hole 40, a pin member 42, which penetrates the control shaft 41 in a direction perpendicular to the axis M thereof, is press-fitted. Moreover, in the upper portion (or upper surface) of the pump body 33, on a periphery of an opening of the through hole 40, plural pairs of engaging portions 33b to 33d, which are different in height, are formed (refer to FIG. 3D and FIG. 4). Then, both ends of the pin member 42, which penetrate the control shaft 41 and protrude (are exposed to an outside) from an outer circumferential surface of the control shaft 41, are configured to be engaged with any pair of the plural pairs of the engaging portions 33b to 33d depending on a rotational position of the control shaft 41. Note that, here, a state is described, in which both ends of the pin member 42 are engaged with the engaging portions 33c and 33c having medium height. If the engaging portions engaged with both ends of the pin member 42 are changed, then a position (position in the direction of the axis M) of the control shaft 41 in the through hole 40 is changed, whereby an contact position of the movement adjustment portion 41a in contact with the rear end surface 31c of the plunger 31, which is formed as an inclined surface, is changed. In this embodiment, the movement adjustment portion 41a is configured to be in contact with any of a position close to an outer edge of the rear end surface (inclined surface) 31c of the plunger 31, a position close to a center of the rear end surface 31c, and a position between these positions, depending on a position of the control shaft 41.

To a predetermined position on the other end side (lower end side) of the control shaft 41, which protrudes to the other side (lower side) of the through hole 40, a stop ring (retaining ring) 43 is fitted, and on the other end surface (lower end surface) of the control shaft 41, a groove (minus groove) 44 extending in a radial direction is formed. Then, the control shaft 41 is always urged in a direction in which the other end surface (lower end surface) separates apart from the pump body 33 (that is, downward) by a spring 45 disposed between (the lower portion or lower surface of) the pump body 33 and the stop ring 43.

On a back surface side of the pump body 33, an attachment surface 33e configured to be attached to the chain saw body 2 is formed (refer to FIG. 3C and FIG. 3D). The oil pump 30 is configured so that the attachment surface 33e formed (provided) on the pump body 33 can be attached to the chain saw body 2. The attachment surface 33e is formed as a surface corresponding to the predetermined position of the chain saw body 2. In this embodiment, the attachment surface 33e (and the predetermined position of the chain saw body 2) is a flat surface, and is formed to have an extended portion extending to a side (here, downward) opposite the opening 33a (that is, the drive worm 10 side) (refer to FIG. 3C). An intermediate portion in the longitudinal direction of the pump body 33 includes the attachment surface 33e and is formed wider than other portions, and a front side (that is, a side opposite the attachment surface 33e of the pump body 33) of the intermediate portion is formed into a flat surface parallel to the attachment surface 33e (refer to FIG. 3C, FIG. 3D and FIG. 5).

On the attachment surface 33e of the pump body 33 to the chain saw body 2, two guide pins 46 and 46 are erected, and in addition, a fixing hole 47 is formed (refer to FIG. 3C and FIG. 3D). The guide pins 46 and 46 are used for positioning an attachment position of the oil pump 30 to the chain saw body 2 in an event of attaching the oil pump 30 to the chain saw body 2. Specifically, the guide pins 46 and 46 are individually inserted into guide holes (not shown), which correspond thereto and are formed on the chain saw body 2, whereby the attachment position of the oil pump 30 to the chain saw body 2 is positioned. That is to say, in cooperation with the guide holes as positioning elements provided on the chain saw 2, the guide pins 46 and 46 position the oil pump 30 in the event of attaching the oil pump 30 to the chain saw body 2. The guide pins 46 and 46 may be those molded integrally with the pump body 33, or may be those formed separately from the pump body 33 and fixed to the attachment surface 33e of the pump body 33 by press fitting, etc.

On the attachment surface 33e of the pump body 33, the guide pins 46 and 46 are provided apart in the direction of the axis (central axis of the cylinder 32) L of the plunger 31, and each thereof is disposed on a centerline CL of a transverse cross section of the plunger 31 (cylinder 32), that is, on a line passing through a center (position of the axis L) on the transverse cross section (refer to FIG. 3B, FIG. 3C and FIG. 5). In other words, when the oil pump 30 (pump body 33) is viewed from the attachment surface 33e side (back surface side), that is, when the attachment surface 33e is viewed from the chain saw body 2 side, the guide pins 46 and 46 are located apart by a predetermined distance on the axis (central axis of the cylinder 32) L of the plunger 31 (refer to FIG. 3C). Specifically, when the attachment surface 33e is viewed from the chain saw body 2 side, then on the axis L of the plunger 31, the guide pins 46 and 46 are provided so as to be located on both sides across a plane that is perpendicular to the axis (central axis of the cylinder 32) L of the plunger 31 and includes a rotation center axis (=axis of the rotating shaft 9) N of the drive worm 10.

The fixing hole 47 is used to fix the oil pump 30, which is positioned by the guide pins 46 and 46, to the chain saw body 2. Specifically, a fixing bolt (not shown) is inserted through the fixing hole 47, and in addition, the fixing bolt thus inserted is screwed to a bolt hole (not shown) formed on the chain saw body 2, whereby the oil pump 30 is fixed to the chain saw body 2.

The fixing hole 47 is formed in the extended portion of the attachment surface 33e in a penetration manner so as to be located on the side opposite the drive worm 10 across a plane that is parallel to the rotation center axis (=axis of the rotating shaft 9) N of the drive worm 10 and includes the axis (central axis of the cylinder 32) L of the plunger 31. In other words, the fixing hole 47 is disposed so as to be located more apart (here, on a lower side than the guide pins 46 and 46) from the rotation center axis (axis of the rotating shaft 9) N of the drive worm 10 than the guide pins 46 and 46 in the direction perpendicular to the axis (central axis of the cylinder 32) L of the plunger 31 and a direction perpendicular to the rotation center axis (axis of the rotating shaft 9) N of the drive worm 10. In this embodiment, the fixing hole 47 is provided so as to be positioned on the plane that is perpendicular to the axis (central axis of the cylinder 32) L of the plunger 31 and includes the rotation center axis (axis of the rotating shaft 9) N of the drive worm 10. In such a way, when the oil pump 30 (pump body 33) is viewed from the attachment surface 33e side, the guide pins 46 and 46 and the fixing hole 47 are disposed at such positions in which a triangle (further, an acute triangle) is formed by connecting centers of these to one another by a line.

Next, a description is made of functions of the oil pump 30 having such a configuration as described above.

First, the oil pump 30 is attached and fixed to the chain saw body 2 by the fixing bolt inserted through the fixing hole 47 formed in the attachment surface 33e of the pump body 33 to the chain saw body 2. In this event, the guide pins 46 and 46 provided on the attachment surface 33e of the pump body 33 are inserted into the above-described corresponding guide holes on the chain saw body 2, whereby the attachment position of the oil pump 30 to the chain saw body 2 is positioned. In such a way, an appropriate center distance (that is, an appropriate meshing state) between the drive worm 10 provided on the chain saw body 2 and the gear portion 31a of the plunger 31 provided on the oil pump 30 is ensured.

When the drive worm 10 is rotated through the rotating shaft 9 by the motor of the chain saw 1, the plunger 31 is driven through the gear portion 31a by the drive worm 10. Then, the plunger 31 rotates in the cylinder 32 of the pump body 30, and reciprocally moves in the cylinder 32 by a function between the rear end surface (inclined surface) 31c of the plunger 31 and the movement adjustment portion 41a of the control shaft 41. In such a way, the oil pump 30 draws the lubricating oil stored in the oil tank, through the oil intake pipe 11 from the inlet port 38, compresses the lubricating oil, and discharges the lubricating oil from the discharge port 39, and in addition, repeats these operations. Then, the lubricating oil discharged from the discharge port 39 is supplied to the guide groove of the guide bar 6 through the oil supply pipe 12.

Moreover, in the oil pump 30, the engaging portions 33b to 33d, with which both ends of the pin member 42 provided on the one end side of the control shaft 41 are to be engaged, are changed, whereby a discharge amount of the lubricating oil, that is, a supply amount of the lubricating oil to the guide groove of the guide bar 6 is changed. The change of the engaging portions 33b to 33d, with which both ends of the pin member 42 are to be engaged, is performed, for example, by inserting a tip end of a slotted screw driver, etc., into a groove 44 formed on the other end surface of the control shaft 41, and rotating the control shaft 41 while pressing the control shaft 41 against urging force of the spring 45. When the engaging portions 33b to 33d, with which both ends of the pin member 42 are to be engaged, are changed, then radial direction positions of the rear end surface (inclined surface) 31c of the plunger 31, with which the movement adjustment portion 41a are in contact, are also changed. In such a way, the amount of reciprocating movement (stroke amount) of the plunger 31 is changed, and the discharge amount (supply amount of the lubricating oil) of the oil pump 30 is changed.

Note that, in this embodiment, the guide groove of the guide bar 6 corresponds to an "oil-supplied portion requiring an oil supply" of the present invention, the chain saw 1 (chain saw body 2) corresponds to a "device including the oil-supplied portion requiring an oil supply" of the present invention, the chain saw body 2 corresponds to a "predetermined position" of the present invention, the guide pins 46 and 46 correspond to "two positioning portions" of the present invention, and the fixing hole 47 corresponds to a "fixing portion" of the present invention.

In this embodiment, the two guide pins 46 and 46 for positioning the attachment position of the oil pump 30 to the chain saw body 2, that is, the two guide pins 46 and 46 to be used for positioning the oil pump 30 in the event of attaching the oil pump 30 to the chain saw body 2 are provided on the attachment surface 33e of the pump body 33 to the chain saw body 2. Here, the attachment surface 33e is formed as a surface (here, a flat surface) corresponding to the predetermined position of the chain saw 1. Then, the two guide pins 46 and 46 are spaced apart in the direction of the axis (central axis of the cylinder 32) L of the plunger 31, and each thereof is disposed on the centerline CL of the transverse cross section of the plunger 31 (cylinder 32). In other words, when the oil pump 30 is viewed from the back surface (attachment surface 33e) side, the two guide pins 46 and 46 are located apart on the axis (central axis of the cylinder 32) L of the plunger 31.

Therefore, tolerance accumulation, etc., in the event of attaching the oil pump 30 to the chain saw body 2 can be reduced, whereby variations of the center distance between the drive worm 10 and the gear portion 31a of the plunger 31 can be suppressed. Moreover, it is possible to dispose the guide pins 46 and 46 within a range in which the plunger 31 is projected, and accordingly, a size increase of the pump body can be reduced, and a size of the entire oil pump 30 can be reduced in comparison with heretofore. In such a way, the reduction in size and weight of the oil pump 30 can be achieved while ensuring the attachment accuracy of the oil pump 30 to the chain saw body 2. Moreover, the attachment surface 33e and the guide pins 46 and 46 can be usable as processing standards of the pump body 33, and accordingly, the processing accuracy of the pump body 33, and ultimately, manufacturing accuracy of the oil pump 30 can be also enhanced.

Moreover, the two guide pins 46 and 46 are provided so as to be located on both sides across the plane that is perpendicular to the axis (=central axis of the cylinder 32) L of the plunger 31 and includes the rotation center axis (axis of the rotating shaft 9) N of the drive worm 10. In other words, when the oil pump 30 is viewed from the attachment surface 33e side, the two guide pins 46 and 46 are disposed on both sides across a line that is perpendicular to both of the axis (central axis of the cylinder 32) L of the plunger 31 and the rotation center axis (axis of the rotating shaft 9) N of the drive worm 10 (refer to FIG. 3C). Therefore, variations of an attachment attitude (inclination) of the oil pump 30 can be reduced, and in addition, the variations of the center distance between the drive worm 10 and the gear portion 31a of the plunger 31 can be reduced more effectively.

Moreover, the fixing hole 47 for fixing the oil pump 30 to the chain saw body 2 is provided on the attachment surface 33e of the pump body 33 to the chain saw body 2. Then, the fixing hole 47 is disposed on the side opposite the drive worm 10 side across the plane that is parallel to the rotation center axis (=axis of the rotating shaft 9) N of the drive worm 10 and includes the axis (central axis of the cylinder 32) L of the plunger 31. Specifically, the fixing hole 47 is provided so as to be located on the plane that is perpendicular to the axis (central axis of the cylinder 32) L of the plunger 31 and includes the rotation center axis (axis of the rotating shaft 9) N of the drive worm 10. In other words, when the oil pump 30 is viewed from the attachment surface 33e side, the fixing hole 47 is provided at a position that is on a straight line perpendicular to both of the axis (central axis of the cylinder 32) L of the plunger 31 and the rotation center axis (axis of the rotating shaft 9) N of the drive worm 10, and is more apart from the drive worm 10 than the two guide pins 46 and 46 (refer to FIG. 3C). In such a way, while the size increase of the oil pump 30 (pump body 33) by the fixing hole 47 can be reduced, the oil pump 30 positioned by the two guide pins 46 and 46 can be stably fixable by the chain saw body 2.

Moreover, the intermediate portion in the longitudinal direction of the pump body 33 includes the attachment surface 33e and is formed wider than the other portions, and in addition, the side opposite the attachment surface 33e of the pump body 33 is formed as the flat surface parallel to the attachment surface 33e formed flat. In such a way, an installation space of the oil pump 30 in the chain saw 1 can be reduced, and in addition, installation of other components adjacent to the oil pump 30 can also be performed with ease.

Moreover, the plunger 31 and the control shaft 41 are supported on the pump body 33 at two points spaced apart in the respective axial directions (axis L, axis M). In such a way, inclining of the plunger 31 and the control shaft 41 can be reduced during operations thereof, and stable pump operations can be realized.

The description has been made above of the embodiment of the present invention; however, the present invention is not limited to the above-mentioned embodiment, and as a matter of course, various modifications and alterations are possible based on the technical idea of the present invention. Some of the modifications and the alterations are exemplified below.

For example, in the above-mentioned embodiment, the two guide pins 46 and 46 are provided so as to be located on both sides across the plane that is perpendicular to the axis (central axis of the cylinder 32) L of the plunger 31 and includes the rotation center axis (=axis of the rotating shaft 9) N of the drive worm 10. However, the present invention is not limited to this, and one of the guide pins 46 and 46 may be disposed on the plane that is perpendicular to the axis (central axis of the cylinder 32) L of the plunger 31 and includes the rotation center axis (=axis of the rotating shaft 9) N of the drive worm 10. In this case, when the oil pump 30 is viewed from the attachment surface 33e side, one of the two guide pins 46 and 46 is located on the straight line perpendicular to the axis (central axis of the cylinder 32) L of the plunger 31 and the rotation center axis (axis of the rotating shaft 9) N of the drive worm 10 in a similar way to the fixing hole 47. However, in the above-mentioned embodiment, a distance between the two guide pins 46 and 46 in the direction of the axis (central axis of the cylinder 32) L of the plunger 31 can be increased more, and accordingly, the above-mentioned embodiment can be said to be superior in terms of the stabilization of the attachment attitude of the oil pump 30.

Moreover, in the above-mentioned embodiment, the two guide pins 46 and 46 are provided on the attachment surface 33e of the pump body 33 to the chain saw body 2; however, two guide holes may be provided on the attachment surface 33e in place of the two guide pins 46 and 46. In this case, on the chain saw body 2, two guide pins (positioning elements) that position the attachment position of the oil pump 30 in cooperation with the two guide holes, just need to be provided. That is to say, the oil pump 30 can be configured to have two guide holes, into which corresponding guide pins provided on the chain saw body 2 are to be inserted, in place of the guide pins 46 and 46 to be inserted into the corresponding guide holes provided on the chain saw body 2.

Moreover, in the above-mentioned embodiment, the two guide pins 46 and 46 and the fixing hole 47 are provided on the attachment surface 33e of the pump body 33 to the chain saw body 2. However, the two guide pins 46 and 46 and the fixing hole 47 just need to be disposed on the same plane, and do not necessarily have to be provided on one continuous surface. Moreover, the fixing hole 47 may be provided at a position different from that of the above-mentioned embodiment.

Moreover, in the above-mentioned embodiment, the description has been made of the oil pump 30 for use in and attached to the chain saw 1; however, the present invention is not limited to this, and is also applicable to an oil pump for use in and attached to a variety of devices, each includes the oil-supplied portion requiring an oil supply.

In accordance with the oil pump according to the present invention, the tolerance accumulation, etc., in the event of attaching the oil pump to the device can be reduced, and the attachment accuracy thereof can be ensured, and in addition, the reduction in size and weight of the oil pump can be achieved.

What is claimed is:

1. An oil pump attached to a predetermined position of a device having an oil-supplied portion requiring an oil supply, and supplying oil to the oil-supplied portion in such a manner that a plunger having a gear portion meshing with a drive worm provided on the device reciprocally moves in a pump body while rotating, the oil pump comprising:
    an attachment surface provided on the pump body and attached to the predetermined position; and
    two positioning portions provided on the attachment surface, the two positioning portions positioning the oil pump in an event of attaching the oil pump to the predetermined position,
    wherein the two positioning portions are spaced apart in an axial direction of the plunger, and each of the positioning portions is disposed on a centerline of a transverse cross section of the plunger, and
    wherein when the oil pump is viewed from an attachment surface side, the two positioning portions are located apart on an axis of the plunger.

2. The oil pump according to claim 1,
    wherein the two positioning portions are provided so as to be located on both sides across a plane that is perpendicular to the axis of the plunger and includes a rotation center axis of the drive worm.

3. The oil pump according to claim 1, further comprising:
    a fixing portion provided on the pump body, the fixing portion fixing the oil pump to the predetermined position,
    wherein the fixing portion is provided so as to be located on a side opposite the drive worm across a plane that is parallel to a rotation center axis of the drive worm and includes the axis of the plunger.

4. The oil pump according to claim 3,
    wherein the fixing portion is provided so as to be located on a plane that is perpendicular to the axis of the plunger and includes the rotation center axis of the drive worm.

5. The oil pump according to claim 3,
    wherein the fixing portion is formed on the attachment surface on which the two positioning portions are provided.

6. The oil pump according to claim 1,
    wherein a side opposite the attachment surface of the pump body is formed as a flat surface parallel to the attachment surface.

7. The oil pump according to claim 1,
    wherein the plunger is supported on the pump body at two points spaced apart in the axial direction of the plunger.

8. The oil pump according to claim 1,
    wherein, in the axial direction of the plunger, on one end side of the pump body, an inlet port through which the oil is drawn and a discharge port through which the oil is discharged are formed, and on an other end side of the pump body, a control shaft capable of changing an amount of reciprocating movement of the plunger is housed.

9. The oil pump according to claim 8,
    wherein the control shaft is supported by the pump body at two points spaced apart in an axial direction of the control shaft.

10. The oil pump according to claim 8,
wherein the control shaft penetrates the pump body in a direction perpendicular to the axis of the plunger and has both end portions protruding from the pump body.

11. The oil pump according to claim 1,
wherein the two positioning portions are guide pins to be inserted into guide holes formed in the predetermined position or guide holes into which guide pins provided in the predetermined position are to be inserted.

12. An oil pump attached to a predetermined position of a device having an oil-supplied portion requiring an oil supply, and supplying oil to the oil-supplied portion in such a manner that a plunger having a gear portion meshing with a drive worm provided on the device reciprocally moves in a pump body while rotating,
wherein, on an attachment surface of the pump body configured to be attached to the predetermined position, two positioning portions for positioning the oil pump in an event of attaching the oil pump to the predetermined position are provided, and
wherein the two positioning portions are spaced apart in an axial direction of the plunger, and each of the positioning portions is disposed on a centerline of a transverse cross section of the plunger, and
wherein when the oil pump is viewed from an attachment surface side, the two positioning portions are located apart on an axis of the plunger.

* * * * *